(12) United States Patent
Lee et al.

(10) Patent No.: US 10,841,510 B2
(45) Date of Patent: Nov. 17, 2020

(54) ELECTRONIC DEVICE AND METHOD FOR IMAGE PROCESSING

(71) Applicant: Samsung Electronics Co., Ltd., Gyeonggi-do (KR)

(72) Inventors: Woo-Yong Lee, Gyeonggi-do (KR); Jae-Yun Song, Seoul (KR); Kang-Hwan O, Gyeonggi-do (KR); Hyun-Jung Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/707,549

(22) Filed: Dec. 9, 2019

(65) Prior Publication Data
US 2020/0112689 A1 Apr. 9, 2020

Related U.S. Application Data

(63) Continuation of application No. 16/402,503, filed on May 3, 2019, now Pat. No. 10,506,176, which is a (Continued)

(30) Foreign Application Priority Data

Mar. 14, 2013 (KR) .......................... 10-2013-0027590

(51) Int. Cl.
*H04N 5/262* (2006.01)
*H04N 5/232* (2006.01)
(Continued)

(52) U.S. Cl.
CPC ........... *H04N 5/2621* (2013.01); *G06T 11/40* (2013.01); *H04N 5/232* (2013.01); (Continued)

(58) Field of Classification Search
CPC ............ H04N 5/23293; H04N 5/2621; H04N 5/23216; H04N 5/23222; H04N 5/23245; (Continued)

(56) References Cited

U.S. PATENT DOCUMENTS 6,657,658 B2    12/2003    Takemura
7,349,119 B2     3/2008    Tsukioka
(Continued)

FOREIGN PATENT DOCUMENTS

CN          1613047 A      5/2005
CN          1731340 A      2/2006
(Continued)

OTHER PUBLICATIONS

"Review of Samsung Galaxy S3-the flagship of 2012," http://mobile-review.com/review/samsung-galaxy-s3-fl.shtml. pp. 1-58.
(Continued)

*Primary Examiner* — Michael S Osinski
(74) *Attorney, Agent, or Firm* — Cha & Reiter, LLC

(57) ABSTRACT

A method for displaying images is provided, including displaying, by an electronic device, a first image obtained from an image sensor; displaying, by the electronic device, a plurality of second images together with the first image, wherein each second image is generated based on the first image and a respective image filter; and responsive to a selection of at least one second image, generating a third image based on the first image and the selected second image's respective image filter and displaying the third image in place of the first image.

28 Claims, 21 Drawing Sheets

Related U.S. Application Data continuation of application No. 15/588,882, filed on May 8, 2017, now Pat. No. 10,284,788, which is a continuation of application No. 15/364,423, filed on Nov. 30, 2016, now Pat. No. 9,674,462, which is a continuation of application No. 14/208,719, filed on Mar. 13, 2014, now Pat. No. 9,571,736.

(51) Int. Cl.

| | | |
|---|---|---|
| *G06T 11/40* | (2006.01) | |
| *H04N 9/04* | (2006.01) | |
| *H04N 9/07* | (2006.01) | |
| *H04N 9/74* | (2006.01) | |
| *H04N 9/79* | (2006.01) | |
| *G06F 3/0488* | (2013.01) | |
| *G06F 3/0481* | (2013.01) | |
| *G06F 3/0482* | (2013.01) | |
| *G06F 3/0485* | (2013.01) | |

(52) U.S. Cl.
CPC ..... *H04N 5/23229* (2013.01); *H04N 5/23293* (2013.01); *H04N 9/045* (2013.01); *H04N 9/07* (2013.01); *H04N 9/74* (2013.01); *H04N 9/79* (2013.01); *G06F 3/0482* (2013.01); *G06F 3/0485* (2013.01); *G06F 3/0488* (2013.01); *G06F 3/04817* (2013.01); *G06F 3/04883* (2013.01)

(58) Field of Classification Search
CPC ........... H04N 5/23229; H04N 2101/00; H04N 2201/3252; G06F 3/04845; G06F 3/04847; G06F 3/04817; G06F 3/0482
See application file for complete search history.

(56) References Cited

U.S. PATENT DOCUMENTS

| | | | |
|---|---|---|---|
| 7,978,248 | B2 | 7/2011 | Terashima |
| 8,072,505 | B2 | 12/2011 | Sugita et al. |
| 8,214,766 | B1 | 7/2012 | Berger et al. |
| 8,532,439 | B2 | 9/2013 | Kosugiyama |
| 8,547,449 | B2 | 10/2013 | Imamura |
| 8,629,847 | B2 | 1/2014 | Arai et al. |
| 8,687,091 | B2 | 4/2014 | Haikin |
| 8,717,381 | B2 | 5/2014 | Hayward et al. |
| 8,754,958 | B2 | 6/2014 | Kim et al. |
| 8,773,566 | B2 | 7/2014 | Wang et al. |
| 8,823,836 | B2 | 9/2014 | Park |
| 8,934,033 | B2 | 1/2015 | Kunishige et al. |
| 8,970,736 | B2 | 3/2015 | Takagi |
| 9,030,593 | B2 | 5/2015 | Hada |
| 9,036,072 | B2 | 5/2015 | Nagamatsu |
| 9,075,459 | B2 | 7/2015 | Matsuzawa et al. |
| 9,277,125 | B2 | 3/2016 | Kunishige et al. |
| 9,313,410 | B2 | 4/2016 | Yamaguchi et al. |
| 9,325,902 | B2 | 4/2016 | Yoshida |
| 9,395,913 | B2 | 7/2016 | Lim et al. |
| 9,674,425 | B2 | 6/2017 | Li et al. |
| 10,277,544 | B2 | 4/2019 | Nakamura et al. |
| 2001/0043279 | A1 | 11/2001 | Niikawa et al. |
| 2003/0081954 | A1 | 5/2003 | Niikawa et al. |
| 2005/0206775 | A1 | 9/2005 | Shiohara |
| 2006/0028667 | A1 | 2/2006 | Saito |
| 2006/0072028 | A1 | 4/2006 | Hong |
| 2006/0192879 | A1 | 8/2006 | Hisamatsu |
| 2007/0058064 | A1 | 3/2007 | Hara et al. |
| 2007/0065137 | A1 | 3/2007 | Hara et al. |
| 2007/0081740 | A1 | 4/2007 | Ciudad et al. |
| 2007/0195354 | A1 | 8/2007 | Tanaka |
| 2007/0255456 | A1 | 11/2007 | Funayama |
| 2009/0073285 | A1 | 3/2009 | Terashima |
| 2009/0154841 | A1 | 6/2009 | Choi et al. |
| 2009/0199134 | A1 | 8/2009 | Murayama |
| 2009/0319897 | A1 | 12/2009 | Kotler et al. |
| 2010/0020238 | A1 | 1/2010 | Kim et al. |
| 2010/0125786 | A1 | 5/2010 | Ozawa et al. |
| 2010/0151047 | A1 | 6/2010 | Pfaff et al. |
| 2010/0194963 | A1 | 8/2010 | Terashima |
| 2010/0214436 | A1 | 8/2010 | Kim et al. |
| 2011/0016408 | A1 | 1/2011 | Grosz et al. |
| 2011/0032373 | A1 | 2/2011 | Forutanpour et al. |
| 2011/0050915 | A1 | 3/2011 | Wang et al. |
| 2011/0231800 | A1 | 9/2011 | Tomita et al. |
| 2011/0267526 | A1 | 11/2011 | Ishihara et al. |
| 2012/0019470 | A1 | 1/2012 | Inomata |
| 2012/0057051 | A1 | 3/2012 | Ito et al. |
| 2012/0066630 | A1 | 3/2012 | Kim et al. |
| 2012/0066644 | A1 | 3/2012 | Mizutani et al. |
| 2012/0081573 | A1 | 4/2012 | Park |
| 2012/0105678 | A1 | 5/2012 | Haikin |
| 2012/0146924 | A1 | 6/2012 | Inoue |
| 2012/0162242 | A1 | 6/2012 | Amano et al. |
| 2012/0176401 | A1 | 7/2012 | Hayward et al. |
| 2012/0236162 | A1 | 9/2012 | Imamura |
| 2012/0268615 | A1 | 10/2012 | Choi et al. |
| 2012/0307101 | A1 | 12/2012 | Fukuya et al. |
| 2012/0307103 | A1 | 12/2012 | Kunishige et al. |
| 2012/0307112 | A1 | 12/2012 | Kunishige et al. |
| 2013/0083219 | A1 | 4/2013 | Heo et al. |
| 2013/0332884 | A1 | 12/2013 | Hitosuga |
| 2014/0049677 | A1 | 2/2014 | Kawaguchi |
| 2014/0092038 | A1 | 4/2014 | Ichinowatari et al. |
| 2014/0118598 | A1 | 5/2014 | Kim |
| 2014/0192244 | A1 | 7/2014 | Ishihara et al. |
| 2014/0327805 | A1 | 11/2014 | Oyama |
| 2014/0351709 | A1 | 11/2014 | Uno et al. |
| 2014/0375862 | A1 | 12/2014 | Kim et al. |
| 2015/0172534 | A1 | 6/2015 | Miyakawa et al. |
| 2015/0227166 | A1 | 8/2015 | Lee et al. |

FOREIGN PATENT DOCUMENTS

| | | |
|---|---|---|
| CN | 102196138 A | 9/2011 |
| CN | 102811306 A | 12/2012 |
| JP | 2000-331181 A | 11/2000 |
| JP | 2007-316452 A | 12/2007 |
| JP | 2009-037614 A | 2/2009 |
| JP | 2009-71666 A | 4/2009 |
| JP | 2009-181501 A | 8/2009 |
| JP | 2011-193405 A | 9/2011 |
| JP | 2012-059061 A | 3/2012 |
| JP | 2012-124608 A | 6/2012 |
| JP | WO2010/119611 A1 | 10/2012 |
| JP | 2012-253449 A | 12/2012 |
| JP | 2013-021409 A | 1/2013 |
| JP | 2013-021548 A | 1/2013 |
| JP | 2015-517135 A | 6/2015 |
| KR | 10-2006-0000408 A | 1/2006 |
| KR | 10-2008-0016145 A | 2/2008 |
| KR | 10-2009-0065204 A | 6/2009 |
| KR | 10-1156676 B1 | 6/2012 |
| RU | 2 440 600 C2 | 1/2012 |

OTHER PUBLICATIONS

Chinese Search Report dated Apr. 16, 2020.
Korean Search Report dated Apr. 27, 2020.
Indian Search Report dated Jun. 1, 2020.
Resolution APPS 300 Troubleshooting on Smart Phone; the first edition; Shoa System Company; Sep. 19, 2012; pp. 234-235.
Japanese Search Report dated Jun. 16, 2020.
Japanese Search Report dated Oct. 13, 2020.

ELECTRONIC DEVICE AND METHOD FOR IMAGE PROCESSING

CROSS REFERENCE TO RELATED APPLICATIONS

This application is a Continuation of U.S. patent application Ser. No. 16/402,503 filed on May 3, 2019 which claims the benefit of the earlier U.S. patent application Ser. No. 15/588,882 filed on May 8, 2017 and assigned U.S. Pat. No. 10,284,788 issued on May 7, 2019 which is a Continuation of U.S. patent application Ser. No. 15/364,423 filed on Nov. 30, 2016 and assigned U.S. Pat. No. 9,674,462 issued on Jun. 6, 2017 which is a Continuation of U.S. patent application Ser. No. 14/208,719 filed on Mar. 13, 2014 and assigned U.S. Pat. No. 9,571,736 issued on Feb. 14, 2017 which claims the benefit under 35 U.S.C. § 119(a) of a Korean Patent Application filed in the Korean Intellectual Property Office on Mar. 14, 2013 and assigned Ser. No. 10-2013-0027590, the contents of which are herein incorporated by reference.

BACKGROUND

1. Field of the Disclosure

The present disclosure relates to electronic devices, and more particularly to an electronic device having an image processing function.

2. Description of the Related Art

Electronic devices such as cellular phones, electronic schedulers, personal complex terminals, laptop computers and the like have become a necessity to modern life. Such 25 devices often include a camera function that permits users to capture images and enhance the captured images by applying various photographic effects to them. At present, the need exists for new user interfaces for applying photographic effects to images that are both effective and easy-to-use.

SUMMARY

The present disclosure addresses this need. In accordance with one aspect of the disclosure, a method for displaying images is provided, the method comprising: displaying, by an electronic device, a first image obtained from an image sensor; displaying, by the electronic device, a plurality of second images together with the first image, wherein each second image is generated based on the first image and a respective image filter; and responsive to a selection of at least one second image, generating a third image based on the first image and the selected second image's respective image filter and displaying the third image in place of the first image.

In accordance with another aspect of the disclosure, an electronic device is provided comprising: a display module; an image sensor for acquiring a first image; and processing circuitry configured to: display, on the display unit, a first image obtained from the image sensor; display, on the display unit, a plurality of second images together with the first image, wherein each second image is generated based on the first image and a respective image filter; and responsive to a selection of at least one second image, generate a third image based on the first image and the selected second image's respective image filter and display the third image in place of the first image.

In accordance with yet another aspect of the disclosure, an electronic device is provided comprising: an image sensor for acquiring an image; one or more processors; a memory for storing processor-executable instructions, which when executed by the one or more processors cause the electronic device to: display, on the display unit, a first image obtained from an image sensor; display, on the display unit, a plurality of second images together with the first image, wherein each second image is generated based on the first image and a respective image filter; and responsive to a selection of at least one second image, generate a third image based on the first image and the selected second image's respective image filter and display the third image in place of the first image.

In accordance with yet another aspect of the disclosure, an electronic device is provided comprising: a processor unit configured to obtain a first image through an image sensor, display at least one second image corresponding to effect for the first image, together with the first image, and, in response to a selection of the at least one second image, display at least a portion of the first image using the effect; and a display module configured to display the at least one second image corresponding to effect for the first image and the first image.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION

Aspects of the present disclosure will be described herein below with reference to the accompanying drawings. In the following description, well-known functions or constructions are not described in detail since they would obscure the disclosure in unnecessary detail. And, terms described below, which are defined considering functions in the present disclosure, may be different depending on user and operator's intention or practice. Therefore, the terms should be defined on the basis of the disclosure throughout this specification.

Figure 1:
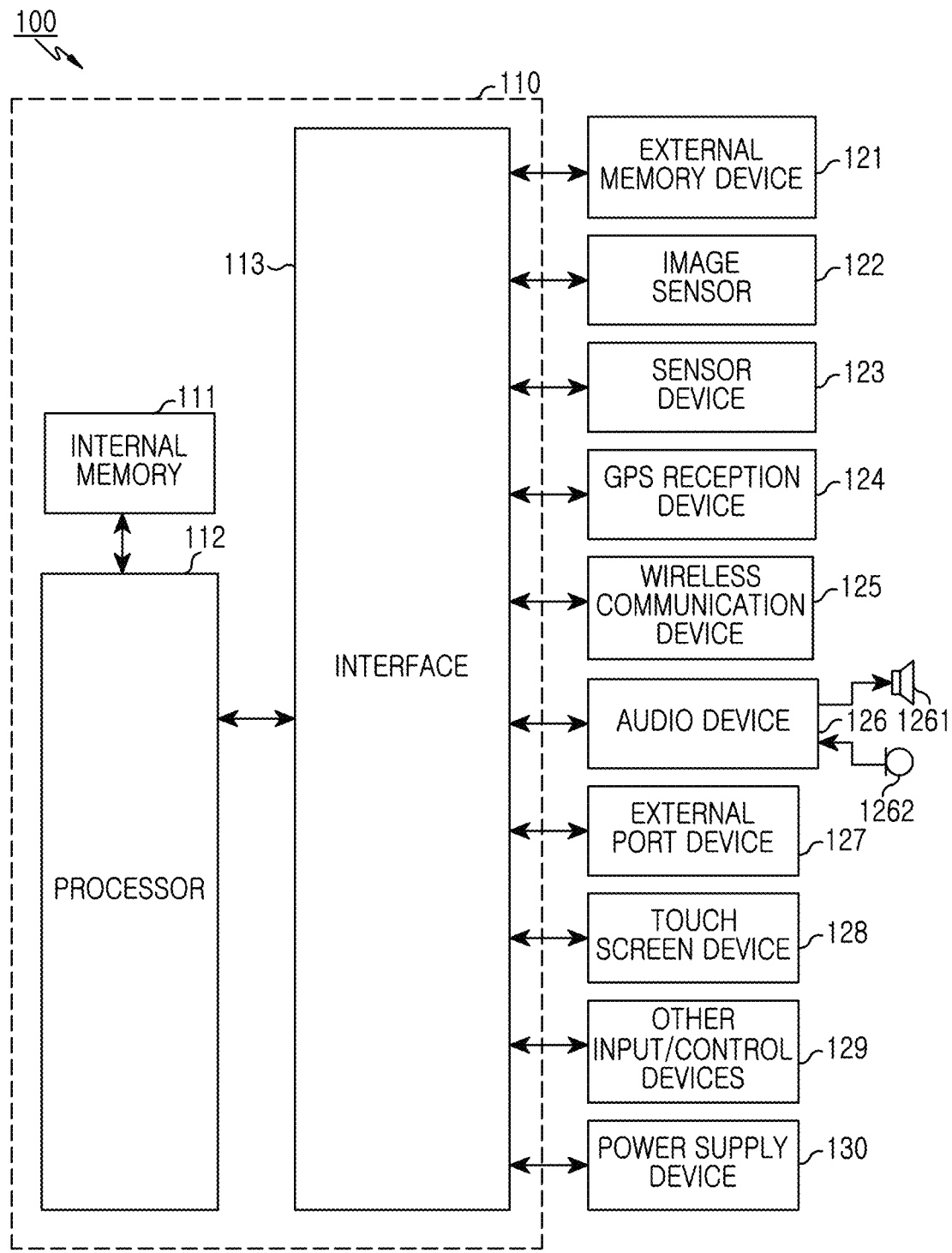
FIG. 1 is a diagram of an electronic device according to aspects of the disclosure.

FIG. 1 is a diagram of an electronic device 100 according to aspects of the disclosure. The electronic device 100 may include a mobile phone, a mobile pad, a media player, a tablet computer, a handheld computer, or a Personal Digital Assistant (PDA), and or any other suitable electronic device. The electronic device 100 may include a host device 110, an external memory device 121, an image sensor 122, a sensor device 123, a Global Positioning System (GPS) reception device 124, a wireless communication device 125, an audio device 126, an external port device 127, a touch screen device 128, other input/control devices 129, and a power supply device 130.

The host device 110 may include an internal memory 111, one or more processors 112, and an interface 113. The internal memory 111, the one or more processors 112, and the interface 113 may be separate constituent elements or they may be integrated together in one or more integrated circuits.

The processor 112 may include any suitable type of processing circuitry, such as an ARM-based processor, a MIPS-based processor, an x86 processor, an FPGA, or another electronic circuit. In some implementations, the processor 112 may be part of a system-on-a-chip (SoC). In operation, the processor 112 may execute various software programs and perform various functions for the electronic device 100, and perform processing and control for voice communication, video communication, and data communication. Also, in addition to this general function, the processor 112 may execute a software program (i.e., an instruction set) stored in the internal memory 111 and/or external memory device 121. In addition, the processor 112 may play even a role of executing a specific software program (i.e., an instruction set) stored in the internal memory 111 and/or external memory device 121 and perform specific various functions corresponding to the executed program. For example, the processor 112 may interwork with the software programs stored in the internal memory 111 and/or external memory device 121 and perform a method of an exemplary aspect. Also, the processor 112 may include one or more Application Processor Units (APUs), Graphics Processor Units (GPUs), audio processor units, communication processor, and/or any suitable type of electronic circuit.

The application processor unit may execute an Operating System (OS) and perform a variety of functions, and it may be one chip gathering all of functions of a core, a memory, a display system/controller, a multimedia encoding/decoding codec, a 2-Dimensional/3-Diminsional (2D/3D) accelerator engine, an Image Signal Processor (ISP), a camera, an audio, a modem, various high and low speed serial/parallel connectivity interfaces and the like. For example, the application processor unit may drive the OS and applications, and may be a System-On-A-Chip (SOC) being one chip gathering various functions of controlling a system device/interface.

The graphics processor unit may perform operations related to graphics processing, and may take charge of image information processing, acceleration, signal conversion, screen output and the like. In some implementations, the graphics processor may be able to process 2D or 3D graphics faster than the application processor unit.

The audio processor unit may perform operations related to audio processing, and may change an audio signal from a digital format to analog format (and vice versa). The communication processor unit may take charge of communication processing between the electronic device 100 and other devices and, when the electronic device 100 intends to use a communication function of a network, the communication processor unit may perform a function of establishing a connection between the electronic device 100 and the like. The interface 113 may connect the host device 110 with various devices of the electronic device 100.

The external memory device 121 may include any suitable type of volatile and non-volatile memory. For example, the external memory device 121 may include high-speed random access memories and/or non-volatile memories such as one or more magnetic disc storage devices, one or more optical storage devices and/or flash memories (e.g., NAND, NOR). The external memory device 121 stores software. The software may include an OS program, a communication program, a camera program, a graphic program, one or more application programs, a user interface program, a codec program and the like. The term of program may be expressed as a set of instructions, or an instruction set, or a program. The communication program, the camera program, the graphic program, the one or more application programs, the user interface program, and the codec program may use various functions of the OS program through various Application Programming Interfaces (APIs).

The OS program represents an embedded operating system such as WINDOWS, LINUX, Darwin, RTXC, UNIX, OS X, or VxWorks, and may include various software constituent elements controlling general system operation. Control of the general system operation may include memory management and control, storage hardware (device) control and management, power control and management and the like. Also, the OS program may facilitate communications between various hardware (devices) and software constituent elements (modules).

The communication program may enable a communication with a remote computer, server, or electronic device through the wireless communication device 125 or the external port device 127.

The camera program may include a camera-related software constituent element for enabling camera related processes and functions. The camera program may perform pre-processing for applying various effects to an image obtained from the image sensor 122 under API support of Open Graphics Library (OpenGL), DirectX and the like, and perform post-processing for applying various effects to a captured snap image. Filters for those effects may be collectively managed such that the filters may be commonly used in both the pre-processing and the post-processing. In addition, the filters may be used even by other programs in addition to the camera program.

The graphic program may include various software constituent elements for providing and displaying a graphic on the touch screen device 128. The graphic program may include various APIs, such as OpenGL, DirectX and the like, to create graphics. Additionally or alternatively, the graphic program may provide various filters which may apply various effects to an image. It should be understood, that the term "graphics" refers to any type of information that is renderable on a display screen, and it may include a text, a web page, an icon, a digital image, a video, an animation and the like. In some implementations, the graphic program may be an image viewer that focuses usability to image post-processing, an image edition program, a camera related program that is optimized to image pre-processing, a video phone related program and the like. The graphic program may perform post-processing for applying various effects to a rendering-completed image, or may perform pre-processing for applying various effects to an image. As described above, the filters for those effects may be collectively managed such that the filters may be used commonly with other programs.

The camera program and/or the graphic program may perform a function of downloading and installing a filter package file from the external (e.g., a network, an e-mail, a messenger, a detachable external memory or the like). If the camera program and/or the graphic program downloads and installs the filter package file from the network, a filter and filter-related data (e.g., an icon image, a filter name, a filter version and the like) which are included in the filter package file may be managed collectively in a database. Also, when the filter is deleted from the database, not only the filter but the filter package file may be all deleted. The camera program and/or the graphic program may display the icon image and the filter name which indicate the added filter, together. The filter name may be translated and displayed in a user language. Particularly, the camera program may apply the effect of the added filter to an image obtained from the image sensor 122 and then, provide the image by an icon (e.g., a thumbnail image).

The application program may include a browser, an e-mail, an instant message, word processing, keyboard emulation, an address book, a touch list, a widget, Digital Right Management (DRM), voice recognition, voice replication, a position determining function, a location-based service, and or any other suitable software.

The user interface program may include various software constituent elements related to a user interface. Also, the user interface program may include information specifying the manner in which state changes in the user interface are to take place. Such information may specify conditions that trigger the state changes, and or any other suitable information.

The codec program may include a software constituent element related to encoding and decoding of a video file.

The external memory device 121 may further include programs (instructions) in addition to the aforementioned programs. Also, various functions of the electronic device 100 may be implemented in hardware including one or more stream processing, Application Specific Integrated Circuits (ASICs), software, and/or a combination of software and hardware.

The image sensor 122 may convert light reflected from a shot object into an electrical signal. The image sensor 122 may be a Charged Coupled Device (CCD), a Complementary Metal-Oxide Semiconductor (CMOS) or the like.

Various constituent elements of the electronic device 100 may be connected with one another through one or more communication buses (not denoted by reference numerals) or stream lines (not denoted by reference numerals).

The sensor device 123 may include a motion sensor, an optical sensor, a temperature sensor and the like and enable various functions. For example, the motion sensor may sense a motion of the electronic device 100, and the optical sensor may sense ambient light.

The GPS reception device 124 may receive signals sent from GPS satellites and determine a current position.

The wireless communication device 125 may enable wireless communication, and may include a wireless frequency transmitter/receiver and an optical (e.g., infrared) transmitter/receiver. The wireless communication device 125 may include a module that includes at least one antenna, a Radio Frequency (RF) connector and the like. The wireless communication device 125 may be designed to operate through one of a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Fidelity (Wi-Fi) network, a Wireless interoperability for Microwave Access (WiMAX) network, a Bluetooth network or/and the like according to a communication network.

The audio device 126 is connected to a speaker 1261 and a microphone 1262 to take charge of audio input and output of voice recognition, voice replication, digital recording, call function and the like, and may include an audio amplifier. The audio device 126 may communicate with a user through the speaker 1261 and the microphone 1262. Also, the audio device 126 may receive a data signal from the host device 110, convert the received data signal into an electrical signal, and output the converted electrical signal through the speaker 1261. The speaker 1261 may convert an electrical signal into an audible frequency band and output the audible frequency band, and the microphone 1262 may convert a sound wave forwarded from a character or other sound sources into an electrical signal. Also, the audio device 126 may receive the electrical signal from the microphone 1262, convert the received electrical signal into an audio data signal, and transmit the converted audio data signal to the host device 110. The audio device 126 may include an earphone, headphone, or headset that is detachable from the electronic device 100.

The external port device 127 may direct connect the electronic device 100 with other electronic devices, or indirect connect the electronic device 100 with other electronic devices through a network (for example, the Internet, an intranet, a wireless LAN and the like).

The touch screen device 128 may provide an input and output interface between the user device 100 and a user. The touch screen device 128 may apply a touch-sensitive technology, and may forward a user's touch input to the host device 110 and show to the user visual information provided from the host device 110, for example, a text, a graphic, a video and the like. In some implementations, the touch screen device 128 may include a display displaying an image. The display may be one of an Electro Wetting Display (EWD), E-Paper, a Plasma Display Panel (PDP), a Liquid Crystal Display (LCD), an Organic Light Emitting Diode (OLED), and an Active Matrix Organic Light Emitting Diode (AMOLED), and/or any other suitable type of display. In addition, the touch screen device may include a touch sensitive device, such as a stylus-pen digitizer, a capacitive overlay touch panel, a resistance overlay touch panel, a surface acoustic wave touch panel, and an infrared beam touch panel. Although in this example, a touch screen device is used that includes both display and touch sensing components, in other examples only display device may be used. In such examples, a mouse or another type of input device may be used to receive user input.

The other input/control devices 129 may include an up/down button for volume control. In addition to this, the other input/control devices 129 may include at least one of a push button of a specific function, a locker button, a rocker switch, a thumb-wheel, a dial, a stick, and a pointer device such as a stylus and the like.

The power supply device 130 may include at least one Power Management Integrated Circuit (PMIC). The PMIC may adjust a battery power. For example, according to a load to process, the processor 112 may transmit an interface signal dependent on the load to the power supply device 130. The power supply device 130 may adjust a core voltage supplied to the processor 112, adaptive to the processor 112. The processor 112 may be driven at a minimum power all the time. In addition to the PMIC for the host device 110, at least one PMIC related to at least one of the external memory device 121, the image sensor 122, the sensor device 123, the GPS reception device 124, the wireless communication device 125, the audio device 126, the external port device 127, the touch screen device 128, and the other input/control devices 129 may be constructed. Also, one integrated PMIC may be constructed. The integrated PMIC may adjust a battery power of not only the host device 110 but also at least one of the external memory device 121, the image sensor 122, the sensor device 123, the GPS reception device 124, the wireless communication device 125, the audio device 126, the external port device 127, the touch screen device 128, and the other input/control devices 129.

Figure 2:
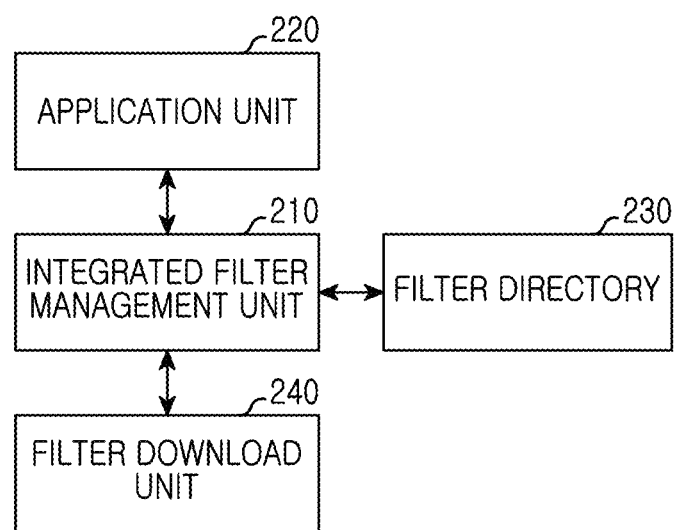
FIG. 2 is a block diagram of a filter management module according to aspects of the disclosure.

FIG. 2 is a block diagram of a filter management module according to aspects of the disclosure. The filter management module may be implemented in hardware (e.g., as one or more electronic circuits), in software (e.g., as processor-executable instructions that are executed by processor 120), or as a combination of software and hardware. As illustrated, the filter management module may include an application unit 220, an integrated filter management unit 210, a filter directory 230, and a filter download unit 240. Each of the units 220 may be implemented in hardware, as one or more instructions that are executable by the processor 120 or as a combination of hardware and software. The application unit 220 may include at least one of an application supporting image pre-processing, an application supporting image post-processing, and an application supporting both the image pre-processing and the image post-processing. The application unit 220 may include an image viewer, an image edition application, a camera application, a video phone application and the like.

The integrated filter management unit 210 may provide an image filter API. If there is a request for a specific effect from the application unit 220, the integrated filter management unit 210 may load a specific filter from the filter directory 230, and call an API function for the loaded filter. The integrated filter management unit 210 may provide video phone applications and other suitable software with an API for image pre-processing or post-processing. The integrated filter management unit 210 may be configured to designate a subject (i.e., a CPU or GPU) that is configured to perform the filtering operation in accordance with the loaded filter in order to generate the effect requested by the application unit 210.

The integrated filter management unit 210 may provide a filter edition function. Through the filter edition function, a user may set a favorite effect list, and the integrated filter management unit 210 may store the favorite effect list in the filter directory 230. Also, the user may select a filter intended to be deleted through the filter edition function, and the integrated filter management unit 210 may delete a specific filter from the filter directory 230. Particularly, when the filter intended to be deleted is a filter installed through a filter package file (i.e., a filter installation file), the integrated filter management unit 210 may delete the filter package file and guarantee a storage space. The filter package file may include a filter, a filter name, an icon image, a vendor, a filter type (pre-processing/post-processing), a version or the like. Also, the user may select synthesizable multiple effects through the filter edition function, and the integrated filter management unit 210 may group filters for the synthesizable multiple effects, and store the grouped filters in the filter directory 230. Also, the integrated filter management unit 210 may use a specific filter commonly used for the image pre-processing and the image post-processing, because the integrated filter management unit 210 collectively stores and manages all of image processing related filters which work in the electronic device 100, in the filter directory 230.

The filter directory 230 may store a plurality of filters, and may be managed by the integrated filter management unit 210. The filter download unit 240 may provide a download function. Through the download function, a user may download a filter from the external (e.g., a network, an e-mail, a messenger, a detachable external memory or the like), and the integrated filter management unit 210 may store the acquired filter in the filter directory 230. Also, the filter download unit 240 may further provide a filter installation function. The user may download a filter package file from the network, and install the filter package file through the filter installation function. If the filter package file is installed, the integrated filter management unit 210 may store a filter and filter-related data (e.g., a filter name, an icon image, a vendor, a filter type or the like) which are included in the filter package file, in the filter directory 230.

Figure 3:
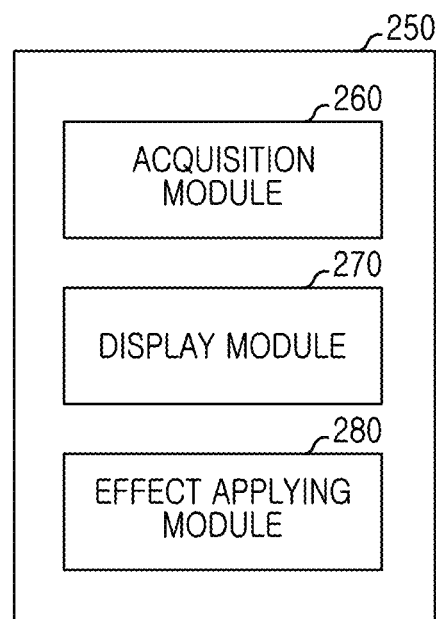
FIG. 3 is a block diagram of an image processing module according to aspects of the disclosure.

FIG. 3 is a diagram of an image processing module according to aspects of the disclosure. The image processing module 250 may be implemented in hardware (e.g., as one or more electronic circuits), in software (e.g., as processor-executable instructions that are executed by processor 120), or as a combination of software and hardware. As illustrated, the image processing module 250 may include an acquisition module 260, a display module 270, and an effect applying module 280.

In operation, the acquisition module 260 may obtain a first image through the image sensor 122. The display module 270 may display at least one second image corresponding to effect for the first image, together with the first image. In response to a selection of the at least one second image, the effect applying module 280 may display at least a portion of the first image by using the effect.

Figure 4:
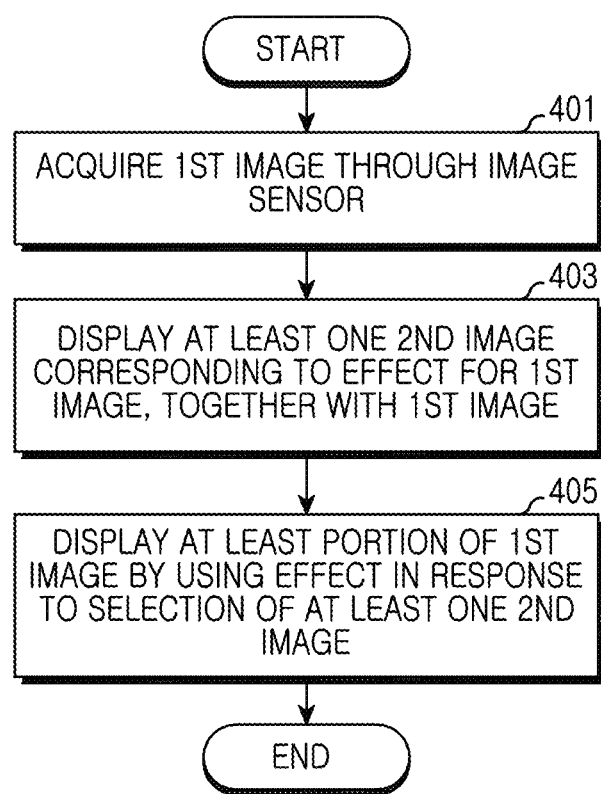
FIG. 4 is a flowchart of a process for image processing according to aspects of the disclosure.

FIG. 4 is a flowchart of a process for image processing according to aspects of the disclosure. In operation 401, a first image is obtained from the image sensor 122. Next, in operation 403, at least one second image corresponding to an effect (or filter) for the first image is displayed together with the first image. The first image may be refreshed in real-time as signals from the image sensor 122 are received. The second image may be created by applying a specific effect to the first image. The second image may be displayed as an icon (e.g., a thumbnail image). In some implementations, the second image may also be refreshed in real-time as signals from the image sensor 122 are received. In operation 405, in response to a selection of at least one second image, at least a portion of the first image may be redisplayed by using effect corresponding to the selected second image. In some implementations, a third image is generated by using the effect corresponding to the selected second image. For example, a user may select the second image displayed on the screen through a gesture (e.g., a touch, hovering, a single touch, a double tap, a drag and drop, flicking or the like). If there is a selection of the second image, the third image is generated and displayed in place of the first image. If a single second image is selected many times, the third image is generated by applying the effect of the second image as many times as the second image is selected. Additionally or alternatively, in some implementations, a plurality of second images may be selected at once. In such instances, the third image may be generated by applying the effect of each one of the selected second images. Thus, the selection of multiple second images, in this example, may cause multiple filters to be applied to the first image when the first image is displayed. In some implementations, the third image may be generated by applying effect(s) or filters, as discussed above, to the first image. Additionally or alternatively, in some implementations, the third image may be generated, by applying effect(s) or filters, as discussed above, to an image frame that is captured by the image sensor 122 after the first image.

Figure 5:
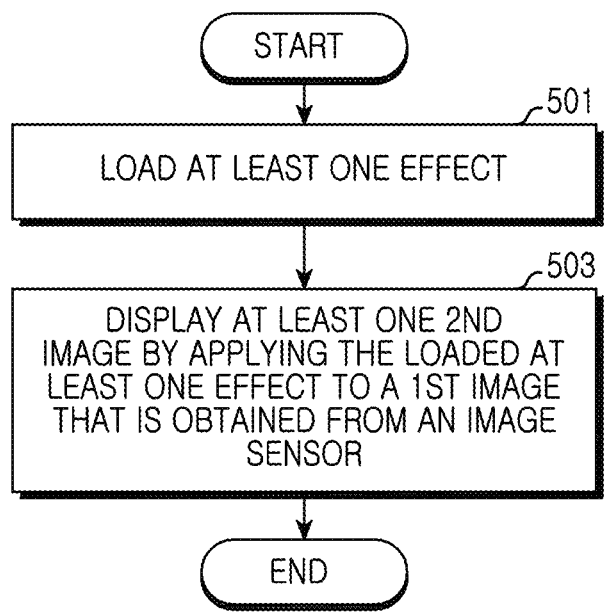
FIG. 5, FIG. 6 and FIG. 7 are flowcharts of processes for displaying a second image according to aspects of the disclosure.

FIG. 5 is a flowchart of a process for displaying a second image according to aspects of the disclosure. In operation 501, at least one effect (or filter corresponding to the effect) is loaded. Next, in operation 503, at least one second image is generated by applying the loaded effect (or filter corresponding to the effect) to a first image that is acquired from the image sensor 122. Afterwards, the generated second image is displayed.

Figure 6:
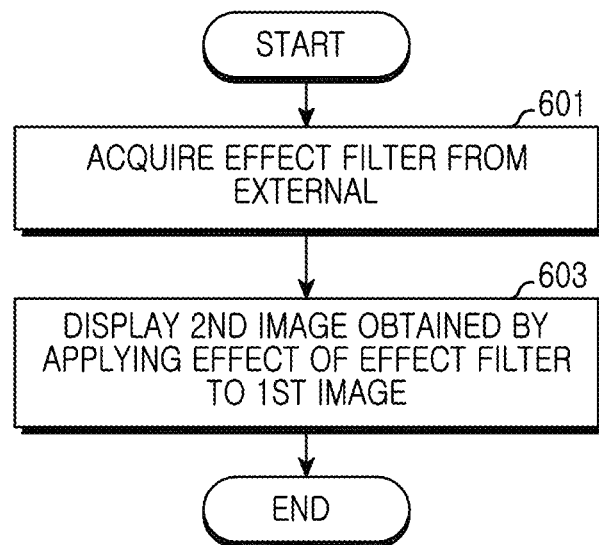

FIG. 6 is a flowchart of another process for displaying a second image according to aspects of the disclosure. In operation 601, an effect filter may be acquired from an external (e.g., a network, an e-mail, a messenger, a detachable external memory or the like). After it is acquired, the effect filter may be stored in a directory that applications commonly use. Next, in operation 603, a second image is generated by applying effect of the acquired effect filter to a first image that is acquired from the image sensor 122. Afterwards, the generated second image may be displayed.

Figure 7:
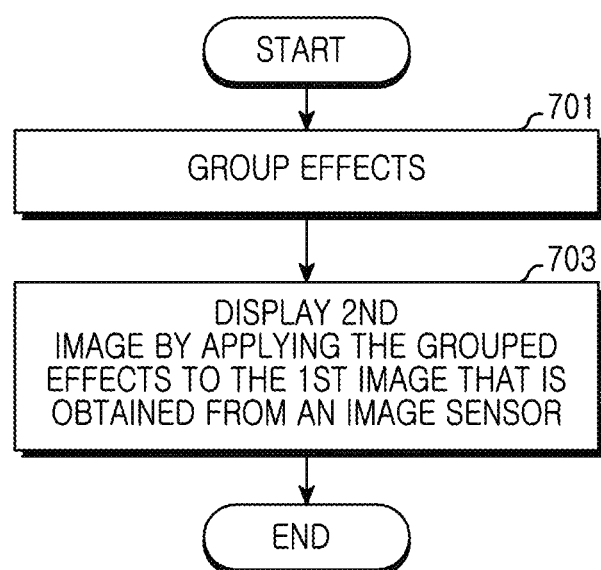

FIG. 7 is a flowchart of yet another process for displaying a second image according to aspects of the disclosure. In operation 701, a group of effects (or filters corresponding to the effects) is selected (or identified). In some implementations, the group may include multiple instances of the same effect (or filter). Additionally or alternatively, in some implementations, the group may include different effects (or filters). Additionally or alternatively, in some implementations, the grouping of the effects (or filters) may be activated by the receipt of user input (e.g., the pressing of a camera button) after selection of a plurality of second images that were generated using the effects that are desired to be included in the group. Next, in operation 703, a first image obtained from the image sensor 122 may be processed by applying all of the effects in the group to the first image, and the resulting filtered image may be displayed.

Figure 8:
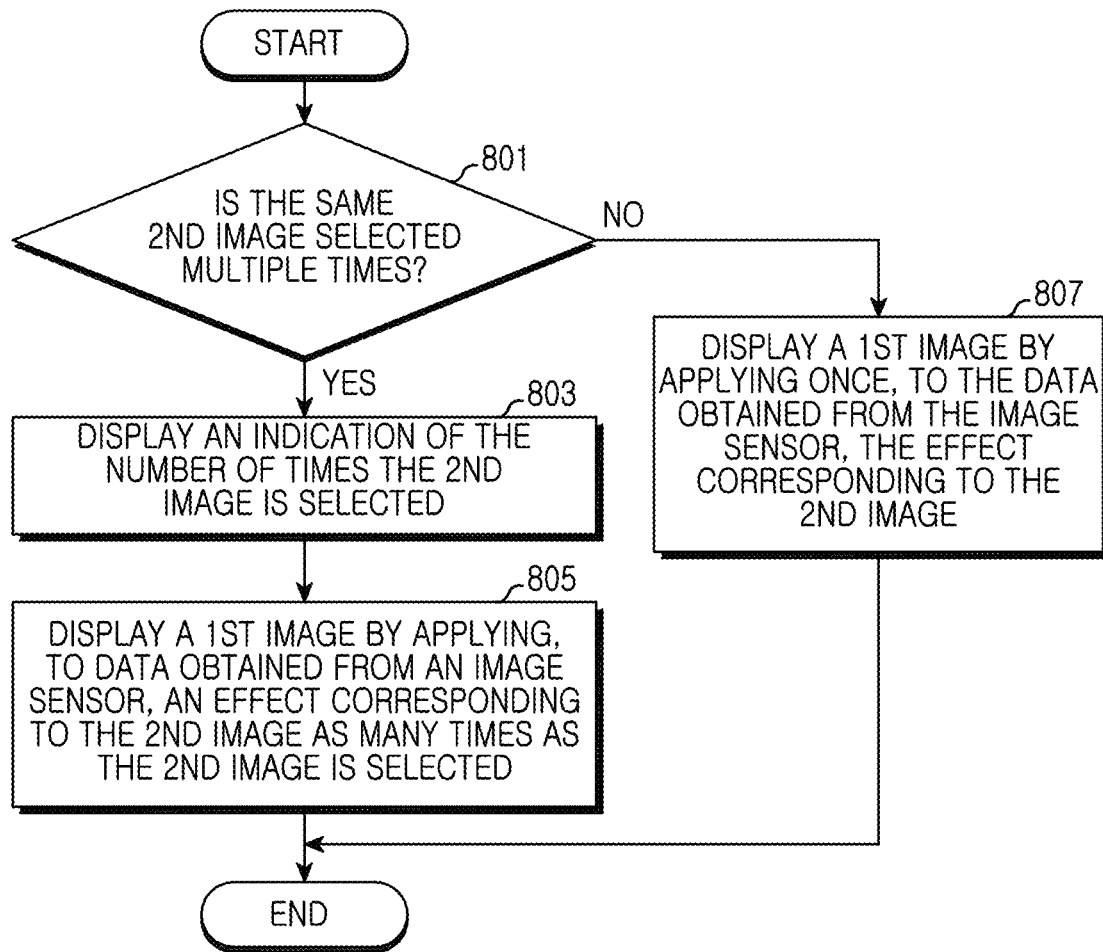
FIG. 8 and FIG. 9 are flowcharts of processes for displaying images according to aspects of the disclosure.

FIG. 8 is a flowchart of a process for displaying images according to aspects of the disclosure. In operation 801, a determination is made if the same second image is selected multiple times. If the same second image is selected multiple times, the processor 112 performs operation 803. Otherwise, if the same image is not selected multiple times, the processor 112 may perform operation 807. Next, in operation 803, an indication of the number of times the same second image is selected is output for presentation to a user. After that, in operation 805, the processor 112 may generate a filtered image by applying, to a first image, the effect (or filter) corresponding to the second image as many times as the second image is selected. Afterwards, the generated filtered image may be displayed. In operation 807, the processor 112 may generate and subsequently display a filtered image by applying once, to the first image, the effect (or filter) of the second image.

Figure 9:
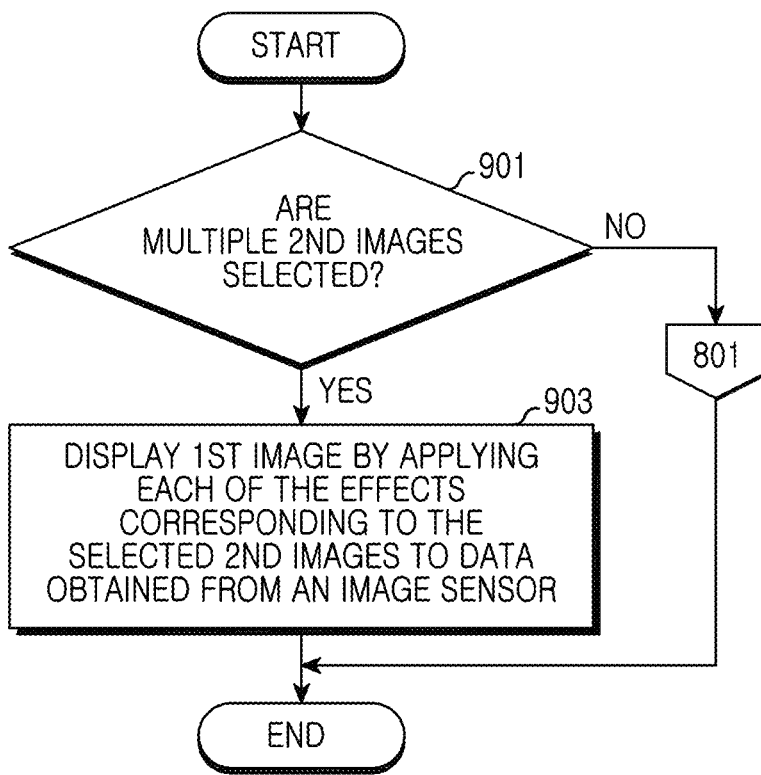

FIG. 9 is a flowchart of another process for displaying images according to aspects of the disclosure. In operation 901, a determination is made whether there is a selection of multiple different second images. If different second images are selected, operation 903 is performed. In operation 903, the effects (or filters) corresponding to each of the selected second images are applied to a first image to generate a filtered image and then the generated filtered image is displayed. Otherwise, if multiple images are not selected, the process discussed with respect to FIG. 8 is performed.

Figure 10:
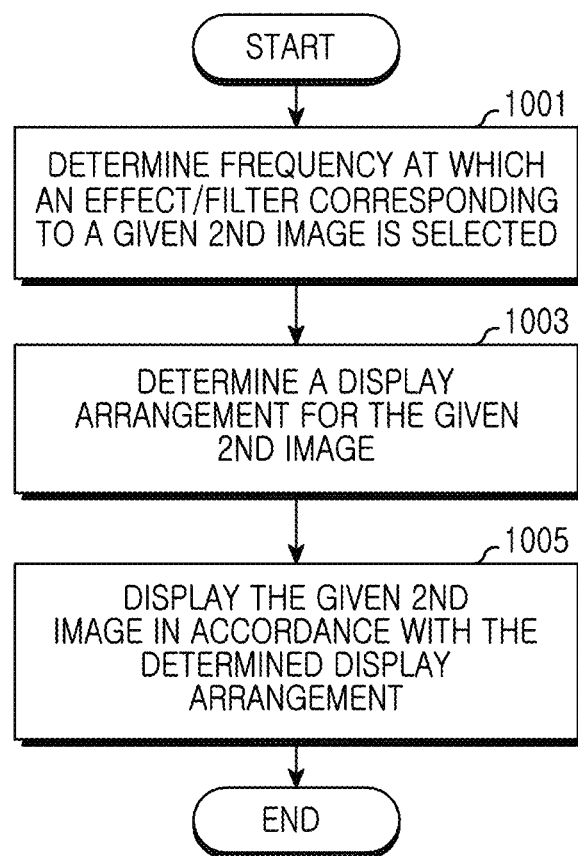
FIG. 10 and FIG. 11 are flowcharts of processes for arranging second images according to aspects of the disclosure.

FIG. 10 is a flowchart of a process for arranging second images according to aspects of the disclosure. In operation 1001, the frequency with which each of the filters (or effects corresponding to the filters) of the plurality of second images is selected is determined. Next, in operation 1003, an order in which the second images from the plurality are to be arranged is determined based on the determined selection frequencies. Afterwards, in operation 1005, the second images are arranged in the determined order. Although in this example, the order of second images is determined based on the second images' respective filters (or effects corresponding to the filters), in other example the location on the touch screen 128 where a given image is displayed based on the frequency with which that second image's respective filter (or effect) is selected.

Figure 11:
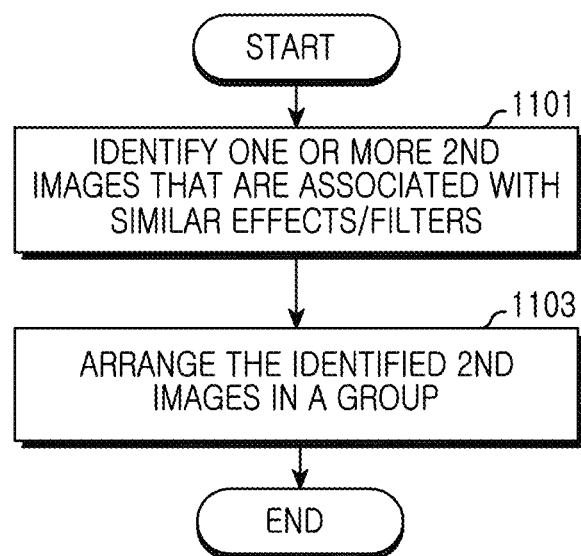

FIG. 11 is a flowchart of another process for arranging second images according to aspects of the disclosure. In operation 1101, one or more second images that are associated with similar effects (or filters) are identified. Next, in operation 1103, the identified second images are arranged in a group. In some implementations, when the second images are arranged in a group, they may be displayed next to each other.

Figure 12:
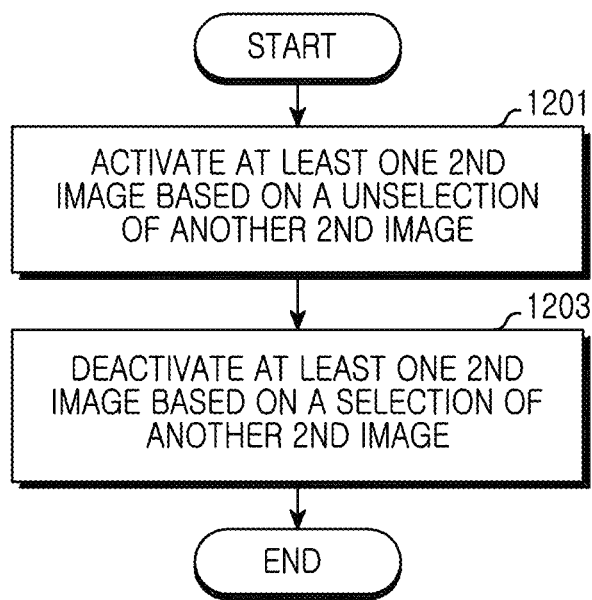
FIG. 12 is a flowchart of a process for displaying second images according to aspects of the disclosure.

FIG. 12 is a flowchart of a process for displaying second images according to aspects of disclosure. Referring to FIG. 12, in operation 1201, the processor 112 (e.g., the display module 270) may activate at least one second image that is associated with an effect which is not synthesizable together with the effect of a second image that has been de-selected (e.g., an image whose selection has been removed by unchecking a checkbox associated with the image). Next, in operation 1203, the processor 112 may deactivate at least one second image that has not been selected based on the deactivated second image being associated with an effect which is not synthesizable together with the effect of a second image that has been selected. In some implementations, two effects may be considered mutually-synthesizable when the filters that implement the effects may be applied on an image one after another. As a trivial example, an effect that changes all red colors in an image into blue may not be applicable after an effect that involves transforming the image to a grayscale color space. In some implementations, when a second image is deactivated, that second image may not be selected by the user.

FIGS. 13 to 21 illustrate screens of a camera application according to various aspects of the disclosure. In these examples, the camera application may use a camera API provided by an electronic device (e.g., smart phone) operating system (OS). The camera API may provide various filters for modifying images captured by the camera. The camera application, may load those filters on a need basis.

Figure 13:
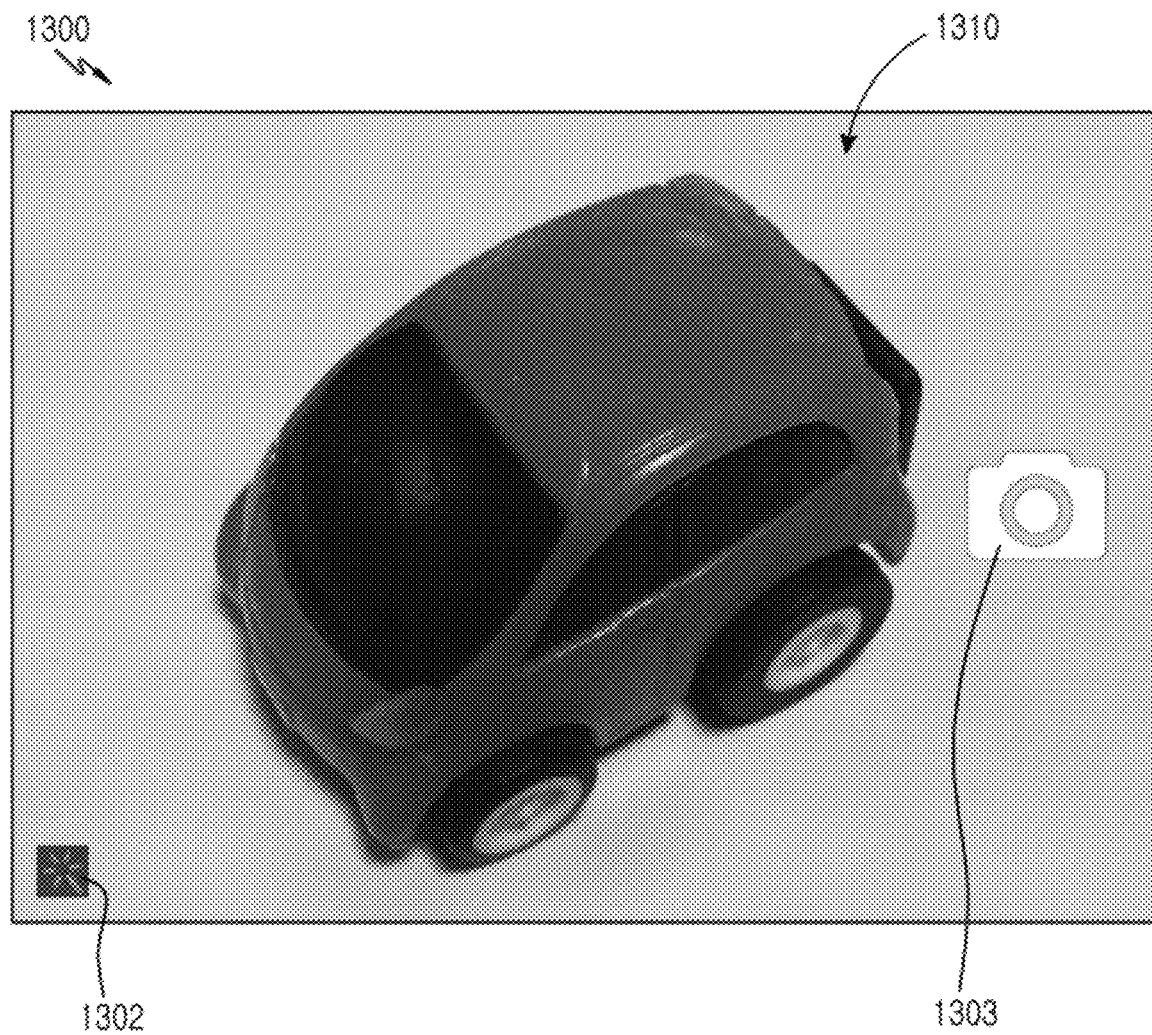
FIG. 13, FIG. 14, FIG. 15, FIG. 16, FIG. 17, FIG. 18, FIG. 19, FIG. 20 and FIG. 21 are diagrams of different screens of a camera application according to aspects of the disclosure.

FIG. 13 illustrates an original screen 1300 of the camera application. According to this example, the screen 1300 may display image data that is being captured by the image sensor 122 in image pane 1310. In some implementations, the content of the image pane 1310 may be refreshed periodically, as new images are being captured the image sensor 122. The screen 1300 may display an effect menu button 1302. If the effect menu button 1302 is pressed, the screen 1300 may show icons corresponding to effects applicable to the image data. In addition, the screen 1300 may display a camera button 1303. If the camera button 1303 is pressed, the screen 1300 may obtain a snap image. The snap image refers to a high-definition image which is obtainable when the camera button 1303 is pressed. When the snap image is obtained, the image pane 1310 may stop being refreshed in real-time and the snap-image may be displayed on the screen permanently, until the user desires to resume the display in real-time of data captured by the image sensor 122. When the user presses the effect menu button 1302, the screen 1300 is switched to a screen 1400 of FIG. 14.

Figure 14:
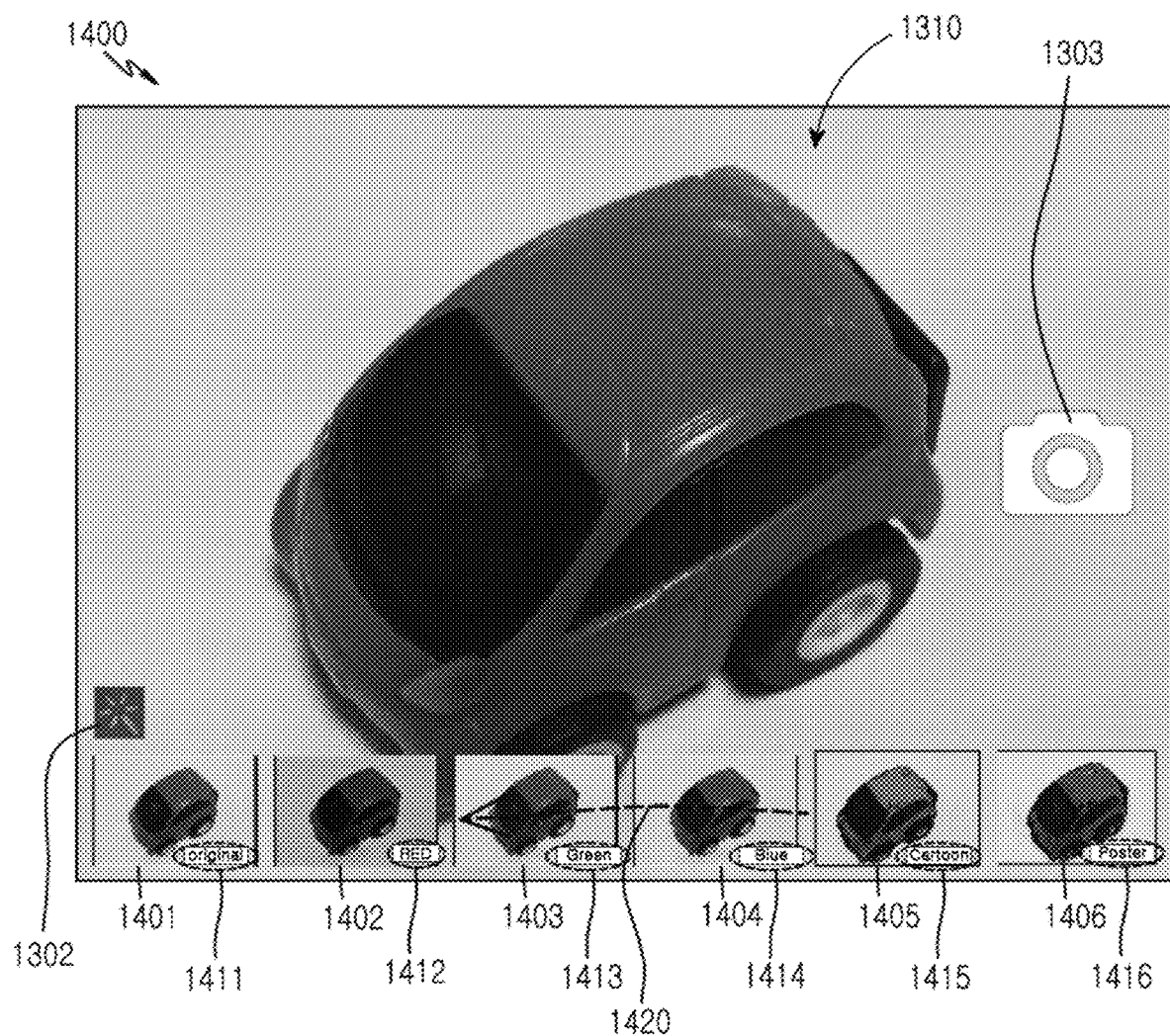

Referring to FIG. 14, if the user presses the effect menu button 1302, the effect menu button 1302 is moved up, and a plurality of icons 1401, 1402, 1403, 1404, 1405, and 1406 may appear arranged horizontally at a lower side of the screen 1400. The icons 1401, 1402, 1403, 1404, 1405, and 1406 may be arranged horizontally at an upper side of the screen 1400 or may be arranged vertically at a left or right side of the screen 1400. If the user presses the effect menu button 1302 once again, the effect menu button 1302 may return to the original position of the screen 1300 of FIG. 13, and the icons 1401, 1402, 1403, 1404, 1405, and 1406 may disappear. If the user touches a region displaying image data obtained from the image sensor 122, the screen 1400 may return to the screen 1300 of FIG. 13. In the absence of a selection of the icons 1401, 1402, 1403, 1404, 1405, and 1406 within a predetermined time period, the screen 1400 may return to the screen 1300 of FIG. 13.

The first icon 1401 may display image data obtained by applying no effect to the image data obtained from the image sensor 122. The other icons 1402, 1403, 1404, 1405, and 1406 may display images that are obtained by processing image data obtained from the image sensor 122 with various filters. The icons 1402, 1403, 1404, 1405, and 1406 may display image data obtained by applying effects to the image data obtained from the image sensor 122, respectively. For example, the second icon 1402 may display image data obtained by applying 'RED' effect to the image data obtained from the image sensor 122. As another example, the third icon 1403 may display image data obtained by applying 'GREEN' effect to the image data obtained from the image sensor 122.

The first icon 1401 may display a label containing the word 'ORIGINAL' 1411 indicating that the image of this icon is an unfiltered version of the image data that is obtained from the image sensor 122. The other icons 1402, 1403, 1404, 1405, and 1406 may display labels identifying the button's respective effects (or filters) 1412, 1413, 1414, 1415, and 1416 indicating effects, respectively. As noted above, the respective filter of a given icon is a filter which may be used to generate the image of that icon.

Figure 15:
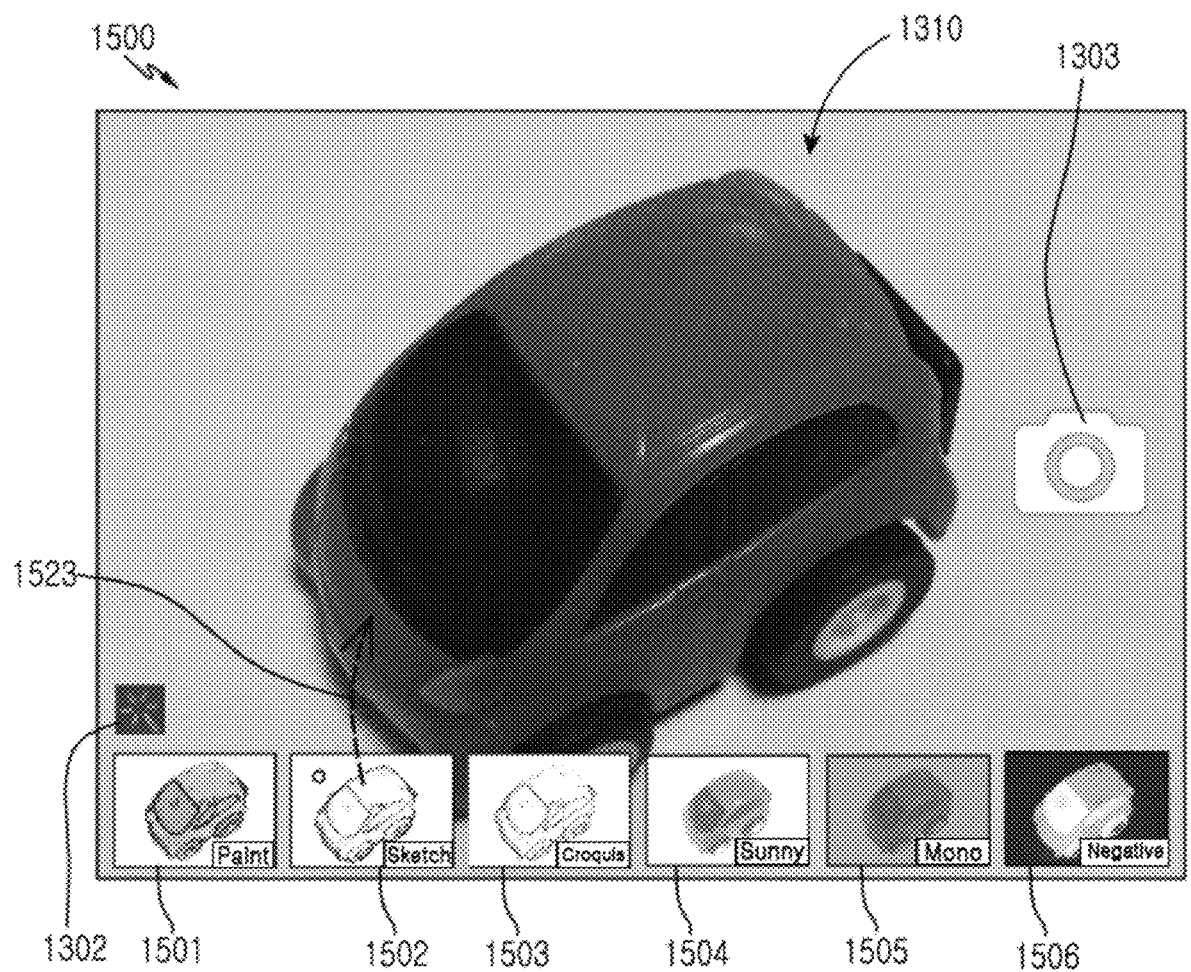
Figure 16:
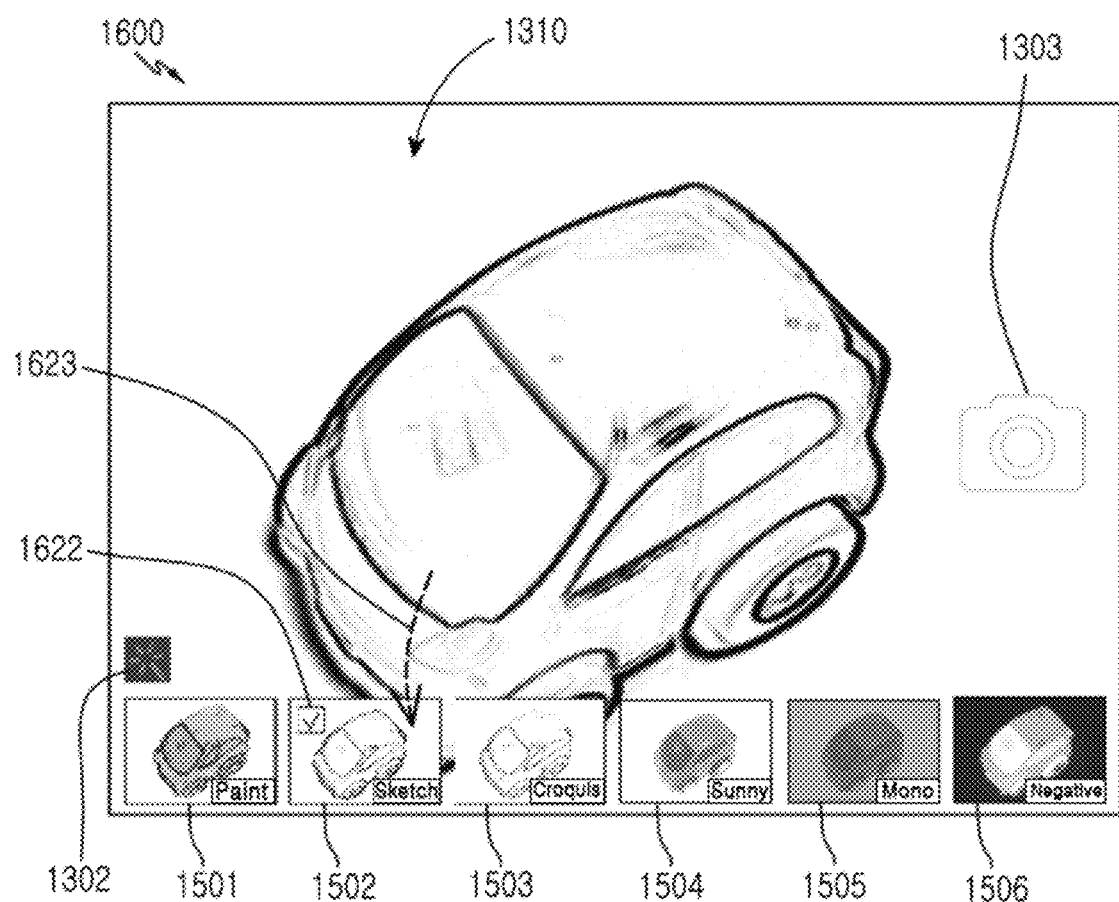

The icons 1401-1406 are scrollable. If the user performs a flick gesture (1420) on the icons 1401-1406, those icons may be scrolled to the left of the screen 1400, and replaced with new icons 1501, 1502, 1503, 1504, 1505, and 1506 as seen on a screen 1500 of FIG. 15. If the user selects the second icon 1502 in the screen 1500 of FIG. 15, the image data obtained from the image sensor 122 may be processed by using the filter corresponding to the second icon 1502 to produce resultant image data and the resultant image data may be displayed in the image pane 1310. As illustrated in FIG. 15, in this example, the second button 1502 is associated with a sketch effect filter.

The second icon 1502 may be selected by any suitable user gesture. A user's gesture of selecting an icon may be a touch, hovering, a single touch, a double tap, a drag and drop, flicking 1523, and the like. For instance, the user may select the second icon if the user touches and flicks (1523) the second icon 1502 towards point in the image pane 1310, Referring to FIG. 16, a selected icon 1502 may display a check box 1622 indicating to indicate that it has been selected. If the user touches the check box 1622, the selection of the icon 1502 may be released. If the user touches and flicks (1623) the region displaying the image data obtained from the image sensor 122 to the selected icon 1502, the selection of the icon 1502 may be released. If the selection of the icon 1502 is released, the check box 1622 may disappear. If the selection of the icon 1502 is released, the sketch effect applied to the image displayed in the image pane 1310 is removed. If the selection of the icon 1502 is released, the image pane 1310 may display image data obtained from the image sensor 122 without modifying that data first with one of the filters corresponding to icons 1502-1506. Additionally or alternatively, in some implementations, if the user touches the aforementioned first icon 1401, the selection of the icon 1502 may also be released.

Figure 17:
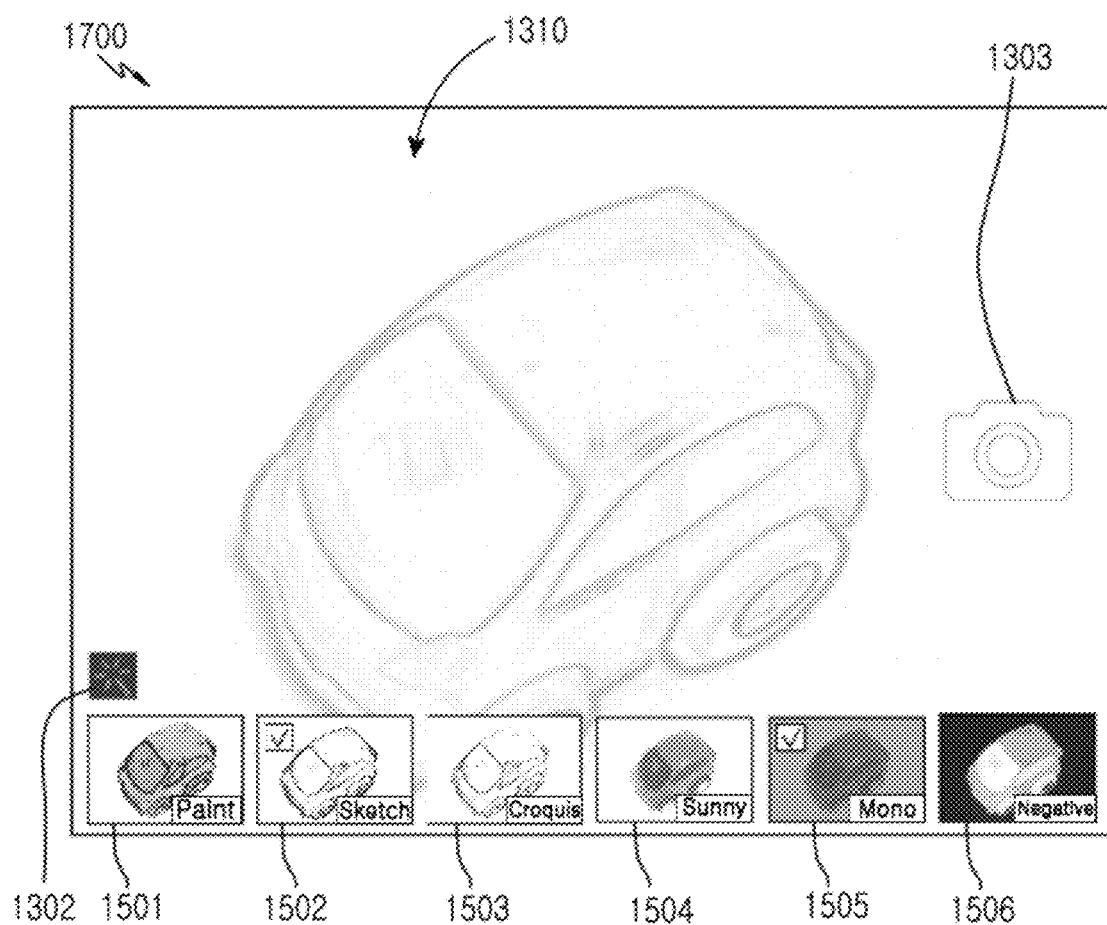

Referring to FIG. 17, if a plurality of different icons are selected, a screen 1700 may display in the image page 1310 image data obtained by applying multiple effects to the image data obtained from the image sensor 122. For instance, if the second icon 1502 and the fifth icon 1505 are selected, the image pane 1310 may display image data obtained by applying a sketch effect and a monochromatic effect to the image data obtained from the image sensor 122.

Figure 18:
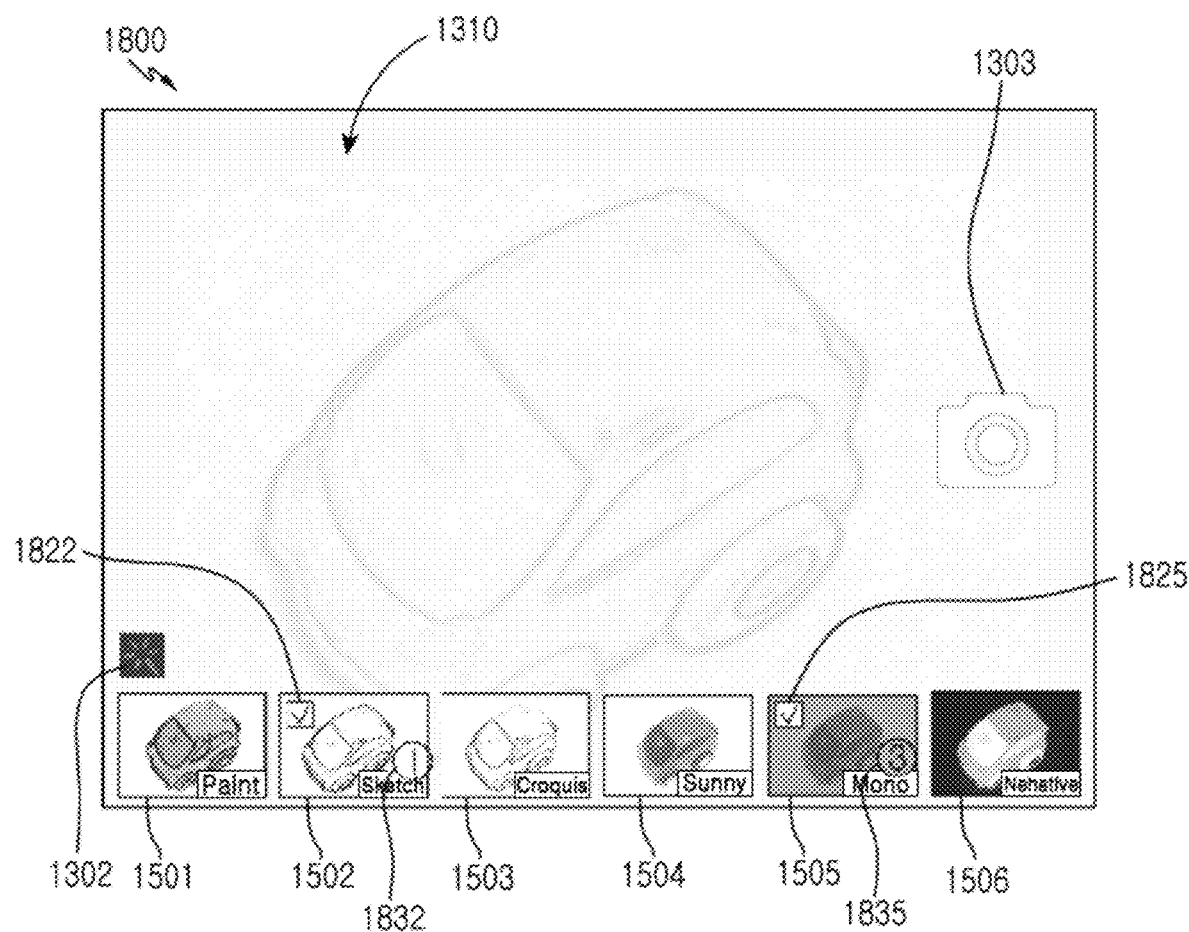

Referring to FIG. 18, if one icon is selected many times, a screen 1800 may display image data obtained by applying, to image data obtained from the image sensor 122, an effect corresponding to the selected icon as many times as the icon is selected. For instance, if the second icon 1502 is selected once and the fifth icon 1505 is selected three times (e.g., by tapping three times on the icon), the image pane 1310 may display resultant image data obtained by applying a sketch effect once and applying a monochromatic effect three times to image data obtained from the image sensor 122. The selected second icon 1502 and fifth icon 1505 may display numerals '1' (1832) and '3' (1835) which indicate the number of times the second icon 1502 and the fifth icon 1505 have been selected, respectively. The once selected second icon 1502 may display only a check box 1822 and/or the numeral '1' (1832). If the user touches a check box 1825 of the fifth icon 1505 once, the screen 1800 may change the numeral '3' displayed in the fifth icon 1505 into '2', thereby causing the image pane 1310 to display resultant image data that is obtained by applying the filter corresponding to icon 1502 (sketch effect filter) once and by applying the filter corresponding to the icon 1505 (monochromatic filter) twice. In that regard, each of the icons 1501-1506 may include user interface components for increasing and/or decreasing the number of times a filter corresponding to that icon is to be applied.

Figure 19:
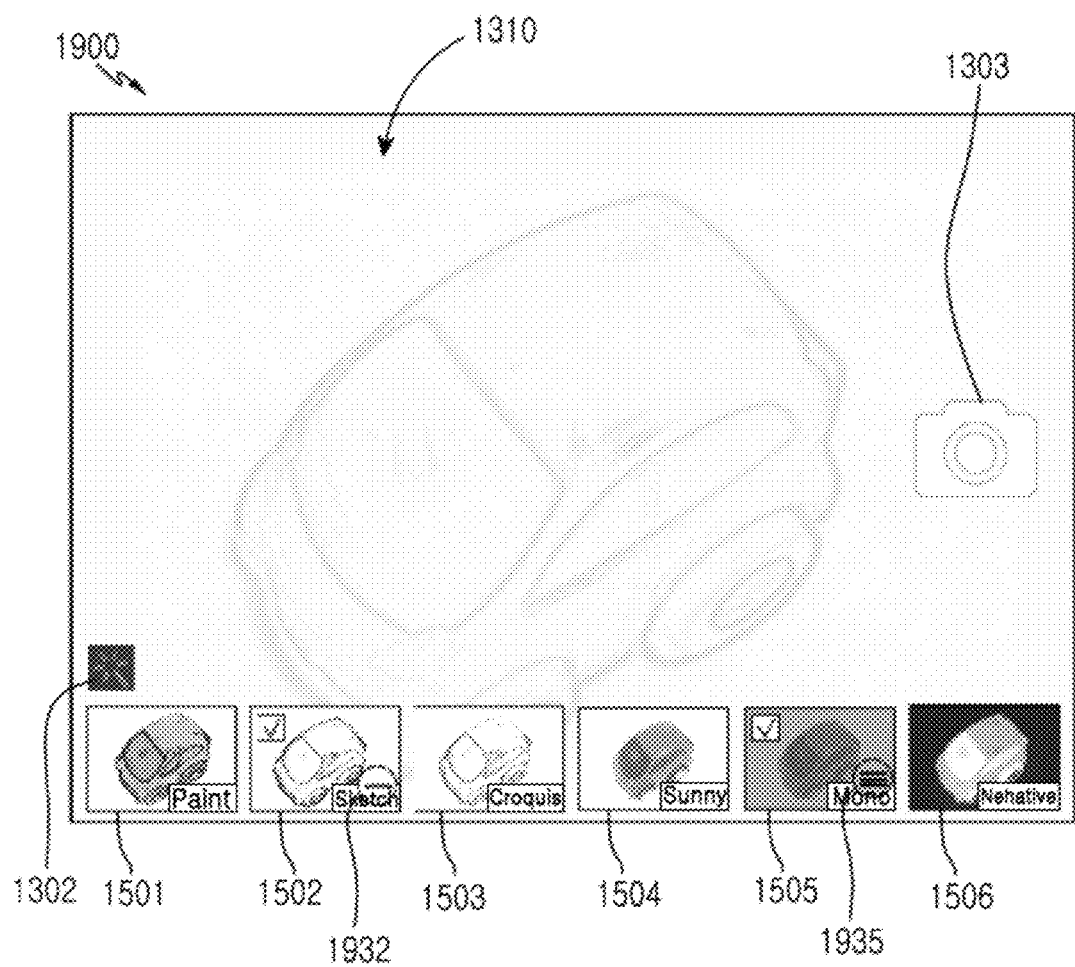

Referring to FIG. 19, a screen 1900 is shown in which the number of times icons have been selected is indicated by dashes 1932 and 1935 superimposed on the icons' images, rather than numerals.

Figure 20:
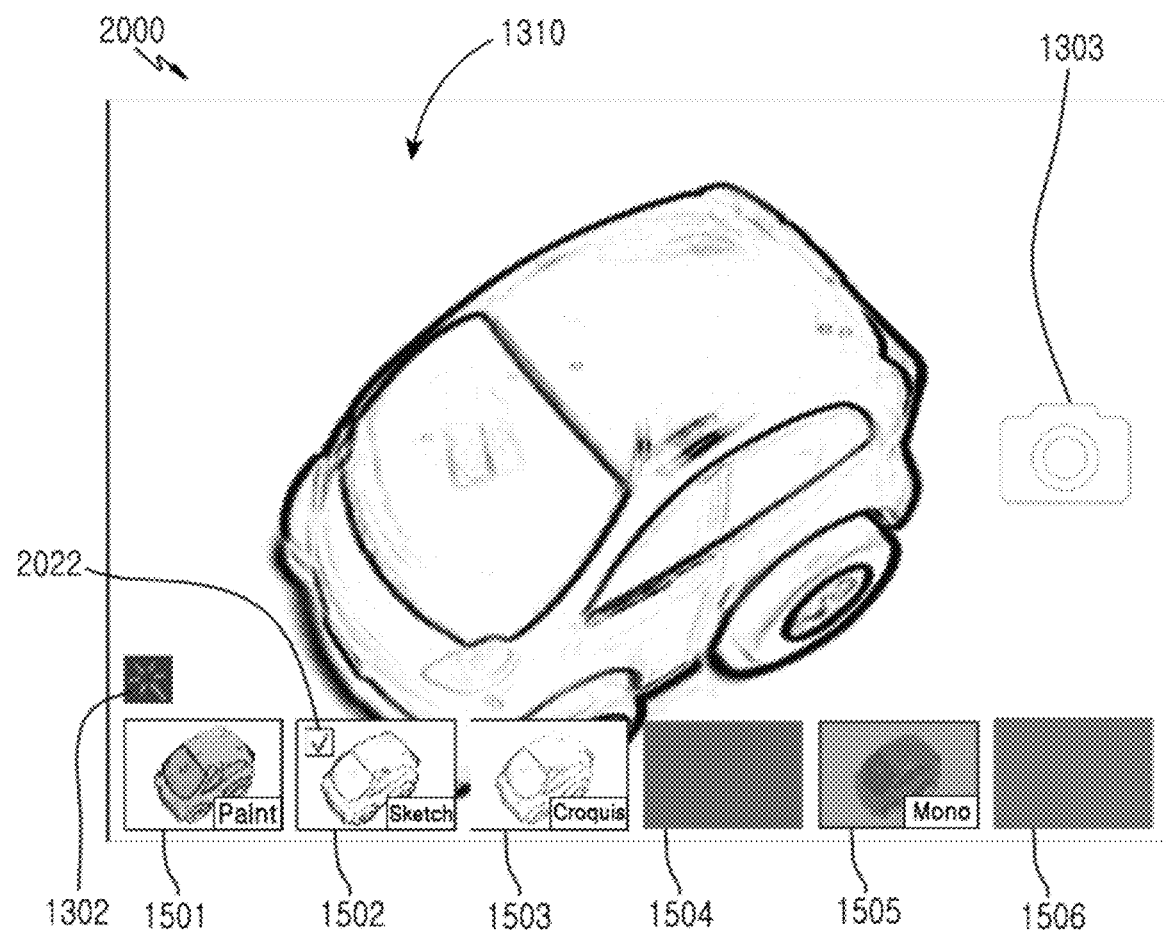

Referring to FIG. 20, an example of a screen 2000 is shown. In this example, icons whose corresponding effects are incompatible with the effects of selected icons are disabled. As illustrated, in this example, icon 1502 is selected and icons 1504 and 1506 are disabled while icons 1503 and 1505 are permitted to remain active. As noted above, in some implementations, two effects (or filters corresponding to the effects) are considered compatible when they are mutually-synthesizable. Additionally or alternatively, two effects (or filters corresponding to the effects) are considered incompatible when they are not mutually-synthesizable.

Figure 21:
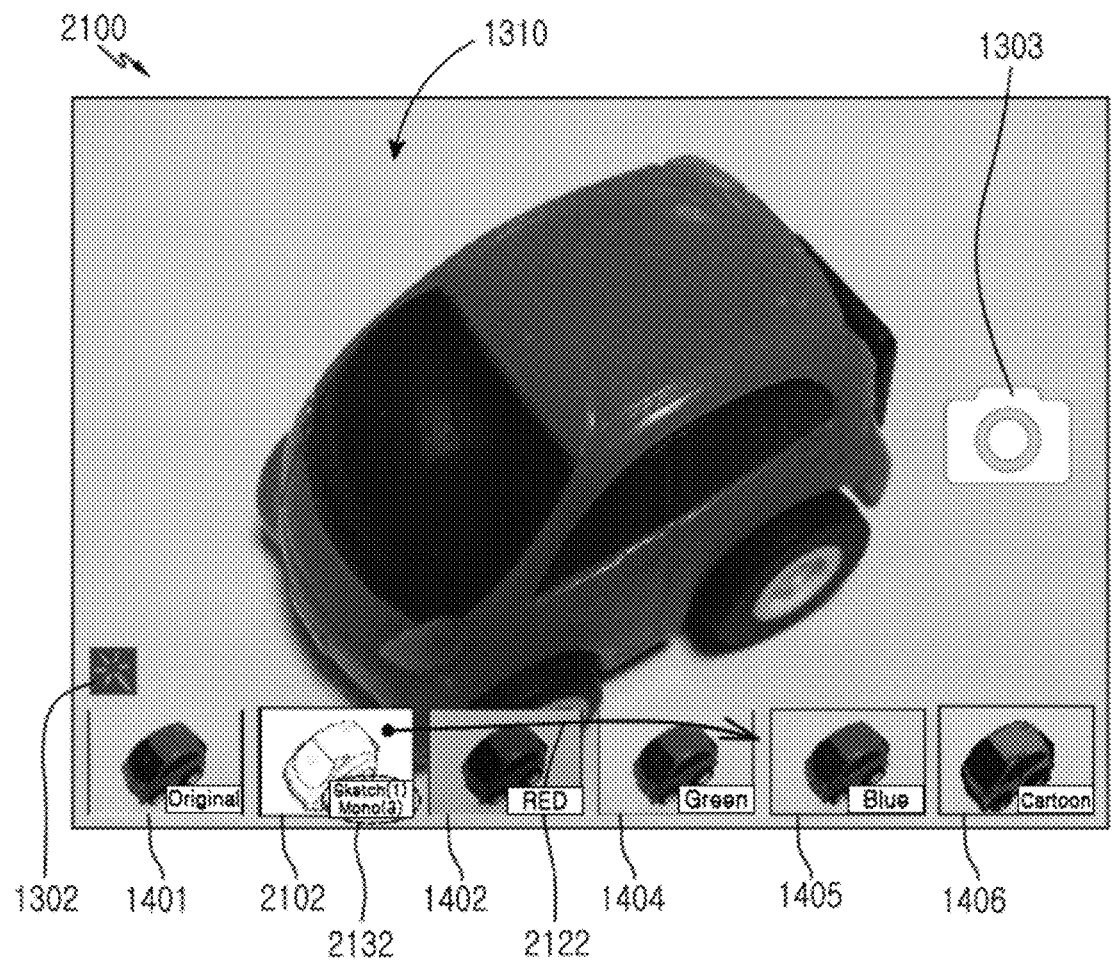

Referring to FIG. 21, an example of a screen 2100 is shown in which if a snap image is acquired. When a snap image is acquired, the images displayed in image pane 1310 and icons 1401, 2102, and 1403-1406 stop being refreshed periodically and are transitioned into a state in which they display only the acquired (e.g., snapped) image. As illustrated, the icons may display the acquired image as modified by applying multiple effects. For instance, if the camera button 1303 is pressed in the screen 1800 of FIG. 18, the screen 2100 may obtain a snap image, and may apply the group of effects (i.e., sketch effect level 1, and monochromatic effect level 3) corresponding to selected icons to the snap image.

In some implementations, the content of one of the icons may vary in dependence on what other icons have been selected. For example, the screen 2100 may display an icon 2102 whose content is based on the identified group of effects discussed with respect to FIG. 18. More specifically, in some instances, the icon 2102 may display image data obtained by applying the grouped effects to the image data obtained from the image sensor 122. Additionally or alternatively, in some implementations, the icon 2102 may display information 2132 indicating the name of two or more of the effects that are applied to image(s) obtained from the image sensor 122 and/or the number of times each of the effects is applied.

Additionally or alternatively, in some instances, the locations in the screen 2100 where an icon is displayed may be changeable in response to user input. For instance, if the user touches and drags the second icon 2102 between the fourth icon 1404 and the fifth icon 1405 and then releases the drag, the second icon 2102 may be moved between the fourth icon 1404 and the fifth icon 1405. Additionally or alternatively, the user may move an icon further towards the center of the image pane 1310 in the same manner. Additionally or alternatively, the position of at least one of the icons 1401, 2102, and 1403-1406 in the screen 2100 may be determined automatically. For instance, an icon of high selection frequency may be arranged in a location favorable for a user's access. In some implementations, icons whose respective filters tend to be selected more frequently than the filters of other displayed icons may be displayed in an upper portion of the screen (while the other icons are displayed at a lower portion of the screen). Furthermore, in some implementations, an icon may be rendered unscrollable based on the frequency with which the filter of the icon is selected exceeding a predetermined threshold, thus resulting in the user being able to scroll other icons, as discussed with respect to FIG. 14, but not the icon whose filter's selection frequency has exceeded the threshold. Furthermore, in some implementations, icons of similar effects may be arranged in a group. For instance, in FIG. 14, the icon 1402 of 'RED' effect, the icon 1403 of 'GREEN' effect, and the icon 1404 of 'BLUE' effect are all for adjusting a color sense and thus, they may be arranged in a group (e.g., by being placed next to each other). A criterion for determining a similarity of effects may be brightness, chroma and the like.

Additionally or alternatively, in some implementations, the camera application may provide a filter addition function. Through the filter addition function, a user may obtain a filter from an external, such as a remote server. The filter may be obtained via a communications network connection, e-mail, messenger, a detachable external memory, and or any other suitable method. The filter obtained from the external may be stored in a designated directory, and may be commonly used by applications. The camera application may add an icon corresponding to the filter obtained from the external. This icon may display image data obtained by applying the effect of the filter to image data obtained from the image sensor 122.

Additionally or alternatively, in some implementations, a user may download a filter package file of an application type from a network, and may install the filter package file. If the filter package file is installed, a filter included in the filter package file may be stored in a designated directory such that applications may make common use of the filter. This filter may be automatically added to a filter list of the camera application, and an icon corresponding to the added filter may be additionally displayed through the aforementioned scheme.

FIGS. 4-11 are provided as examples only. At least some of the operations discussed with respect to these Figures may be executed in parallel, in different order, or altogether omitted. Any of the operations of discussed with respect to FIGS. 4-11 may be executed by processing circuit, such as a processor 112. Furthermore, in some implementations, different ones of the operations discussed with respect to FIGS. 4-11 may be executed by different processing circuitry modules. It will be readily appreciated, that the processes discussed with respect to FIGS. 4-11 may be implemented in hardware, in software (e.g., as processor-executable instructions executed by a processor), or as a combination of hardware and software.) It will be further understood that the terms "effect" and "filter" are used interchangeably throughout the disclosure.

The above-described embodiments of the present disclosure may be implemented in hardware, firmware or via the execution of software or computer code that may be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein may be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the disclosure has been shown and described with reference to certain preferred aspects thereof, it will be understood by those skilled in the art that various changes in form and details may be made therein without departing from the spirit and scope of the disclosure as defined by the appended claims.

What is claimed is:

1. A method for displaying images, the method comprising:
 displaying, by an electronic device on a touch screen, a
  first image based on image data obtained from an image sensor, and an effect menu button, wherein the first image is displayed as a large sized preview image, occupying a majority area of the touch screen, refreshed based on image data obtained in real-time from the image sensor;

detecting a touch input for selecting the effect menu button on the touch screen;

responsive to detecting the touch input for selecting the effect menu button, displaying, by the electronic device, a plurality of second images and the first image, wherein each of the second images is displayed as a thumbnail sized preview image refreshed by applying a respective image effect to image data obtained in real-time from the image sensor;

detecting a touch input for selecting at least one of the second images on the touch screen;

responsive to detecting the touch input for selecting the at least one of the second images, applying a respective image effect of the at least one selected second image to image data obtained from the image sensor to generate a third image;

displaying the third image together with the second images, wherein the third image is displayed in place of the first image as a large sized preview image refreshed based on image data obtained in real-time from the image sensor;

receiving a touch input for capturing a still image; and generating, in response to the touch input, a still image by applying the respective image effect of the third image to image data obtained from the image sensor after receiving the touch input, wherein the second images are refreshed as preview image thumbnails together with the third image as a preview image at least until the touch input for capturing the still image is received.

2. The method of claim 1, wherein the generating of the still image generates the still image with a resolution higher than that of the third image.

3. The method of claim 1, further comprising:

determining whether the touch input for selecting at least one of the second images is received within a specified period of time; and terminating the displaying of the plurality of second images based on a determination that the touch input is not received within the specified period of time.

4. The method of claim 1, further comprising:

detecting a touch input with respect to the effect menu button while the plurality of second images are displayed; and in response to the touch input, terminating the displaying of the plurality of second images.

5. The method of claim 1, further comprising:

displaying a second image to which no filter effect is applied at a predetermined position among the plurality of second images.

6. The method of claim 1, further comprising:

displaying an indication indicating that no filter effect is applied to the second image to which no filter effect is applied.

7. The method of claim 1, further comprising:

displaying, in relation with each of the plurality of second images, an indication indicative of the respective image effect in a specified language.

8. The method of claim 1, further comprising:

determining if the same second image is selected multiple times;

when it is determined that the second image is selected multiple times, displaying an indication of a number of times one of the second images is selected and generating the third image by applying, to a first image, the effect corresponding to the second image as many times as the second image is selected; and when it is determined that the second image is selected a single time, generating the third image by applying once, to the first image, the image effect corresponding to the selected one of the second images.

9. The method of claim 1, further comprising:

determining whether multiple different second images are selected; and when multiple different second images are selected, generating the third image by applying the effects corresponding to the respective selected multiple different second images to the first image.

10. The method of claim 1, further comprising deactivating for selection at least one 10 second image that has not been selected based on that second image being associated with an effect which is not compatible with the effect corresponding to another second image that has been selected.

11. The method of claim 1, further comprising activating for selection at least one 15 second image that is associated with an effect which is not compatible with the effect of another second image that has been de-selected.

12. The method of claim 1, wherein the second images are displayed in an order that is determined based on a characteristic of the second images' respective image effects, wherein the characteristic is selected from a group including color, brightness, and chroma.

13. The method of claim 1, wherein the second images are displayed at a location determined based on a frequency with which that second images' respective image effects have been selected in a past period of time.

14. The method of claim 1, further comprising deactivating one of the second images based on a selection of another one of the second images, wherein the deactivation renders the deactivated second image incapable of being selected.

15. An electronic device comprising:

a memory storing instructions
a touch screen;
an image sensor; and
one or more processor configured to execute the stored instructions to:

display, on the touch screen, a first image based on image data obtained from an image sensor, and an effect menu button, wherein the first image is displayed as a large sized preview image, occupying a majority area of the touch screen, refreshed based on image data obtained in real-time from the image sensor;

detect a touch input for selecting the effect menu button on the touch screen;

responsive to detecting the touch input for selecting the effect menu button, display a plurality of second images and the first image, wherein each of the second images is displayed as a thumbnail sized preview image refreshed by applying a respective image effect to image data obtained in real-time from the image sensor;

detect a touch input for selecting at least one of the second images on the touch screen;

responsive to detecting the touch input for selecting the at least one of the second images, apply a respective image effect of the at least one selected second image to image data obtained from the image sensor to generate a third image;

display the third image together with the second images, wherein the third image is displayed in place of the first image as a large sized preview image refreshed based on image data obtained in real-time from the image sensor;

receive a touch input for capturing a still image; and generate, in response to the touch input, a still image by applying the respective image effect of the third image to image data obtained from the image sensor after receiving the touch input, wherein the second images are refreshed as preview image thumbnails together with the third image as a preview image at least until the touch input for capturing the still image is received.

16. The electronic device of claim 15, wherein the one or more processor is further configured to generate the still image with a resolution higher than that of the third image.

17. The electronic device of claim 15, wherein the one or more processor is further configured to:

determine whether the touch input for selecting at least one of the second images is received within a specified period of time; and terminate the displaying of the plurality of second images based on a determination that the touch input is not received within the specified period of time.

18. The electronic device of claim 15, wherein the one or more processor is further configured to:

detect a touch input with respect to the effect menu button while the plurality of second images are displayed; and in response to the touch input, terminate the displaying of the plurality of second images.

19. The electronic device of claim 15, wherein the one or more processor is further configured to display a second image to which no filter effect is applied at a predetermined position among the plurality of second images.

20. The electronic device of claim 15, wherein the one or more processor is further configured to display an indication indicating that no filter effect is applied to the second image to which no filter effect is applied.

21. The electronic device of claim 15, wherein the one or more processor is further configured to display, in relation with each of the plurality of second images, an indication indicative of the respective image effect in a specified language.

22. The electronic device of claim 15, wherein the one or more processor is further configured to:

determine if the same second image is selected multiple times;

when it is determined that the second image is selected multiple times, display an indication of a number of times one of the second images is selected and generating the third image by applying, to a first image, the effect corresponding to the second image as many times as the second image is selected; and when it is determined that the second image is selected a single time, generate the third image by applying once, to the first image, the image effect corresponding to the selected one of the second images.

23. The electronic device of claim 15, wherein the one or more processor is further configured to:

determine whether multiple different second images are selected; and when multiple different second images are selected, generate the third image by applying the effects corresponding to the respective selected multiple different second images to the first image.

24. The electronic device of claim 15, wherein the one or more processor is further configured to deactivate for selection at least one second image that has not been selected based on that second image being associated with an effect which is not compatible with the effect corresponding to another second image that has been selected.

25. The electronic device of claim 15, wherein the one or more processor is further configured to activate for selection at least one second image that is associated with an effect which is not compatible with the effect of another second image that has been de-selected.

26. The electronic device of claim 15, wherein the second images are displayed in an order that is determined based on a characteristic of the second images' respective image effects, wherein the characteristic is selected from a group including color, brightness, and chroma.

27. The electronic device of claim 15, wherein the second images are displayed at a location determined based on a frequency with which that second images' respective image effects have been selected in a past period of time.

28. The electronic device of claim 15, wherein the one or more processor is further configured to deactivate one of the second images based on a selection of another one of the second images, wherein the deactivation renders the deactivated second image incapable of being selected.

* * * * *

UNITED STATES PATENT AND TRADEMARK OFFICE
CERTIFICATE OF CORRECTION

PATENT NO. : 10,841,510 B2
APPLICATION NO. : 16/707549
DATED : November 17, 2020
INVENTOR(S) : Woo-Yong Lee et al.

Page 1 of 1

It is certified that error appears in the above-identified patent and that said Letters Patent is hereby corrected as shown below:

In the Claims

Column 16, Claim 10, Line 19 should read as follows:
--...selection at least one second image...--

Column 16, Claim 11, Line 25 should read as follows:
--...selection at least one second image...--

Signed and Sealed this
Twenty-second Day of December, 2020

Andrei Iancu
*Director of the United States Patent and Trademark Office*